(12) United States Patent
Vialen

(10) Patent No.: US 6,831,913 B1
(45) Date of Patent: Dec. 14, 2004

(54) METHOD OF IDENTIFYING NETWORK LAYER PDU

(75) Inventor: Jukka Vialen, Espoo (FI)

(73) Assignee: Nokia Networks Oy, Espoo (FI)

( * ) Notice: Subject to any disclaimer, the term of this patent is extended or adjusted under 35 U.S.C. 154(b) by 0 days.

(21) Appl. No.: 09/581,913
(22) PCT Filed: Dec. 17, 1998
(86) PCT No.: PCT/FI98/00991
§ 371 (c)(1), (2), (4) Date: Jul. 21, 2000
(87) PCT Pub. No.: WO99/33288
PCT Pub. Date: Jul. 1, 1999

(30) Foreign Application Priority Data

Dec. 18, 1997 (FI) .................................................. 974560

(51) Int. Cl.[7] ................................................ H04J 3/24
(52) U.S. Cl. ...................................... 370/349; 370/469
(58) Field of Search ................................ 370/328, 329, 370/330, 345, 348, 349, 466, 467, 469

(56) References Cited

U.S. PATENT DOCUMENTS

| 5,563,879 A | 10/1996 | Sanders et al. | |
| 5,566,170 A | 10/1996 | Bakke et al. | |
| 5,841,764 A | * 11/1998 | Roderique et al. | 370/310 |
| 5,923,649 A | * 7/1999 | Raith | 370/328 |
| 5,956,646 A | * 9/1999 | Kolev et al. | 455/502 |
| 6,034,949 A | * 3/2000 | Gellhaus et al. | 370/252 |

FOREIGN PATENT DOCUMENTS

| FR | 2 724 278 | 3/1996 |
| JP | 0 704 450 | 3/1995 |

OTHER PUBLICATIONS

ETS 300 939 (Aug. 1997, 2nd ed.), "Digital Cellular Telecommunications System (Phase 2+); Mobile Radio Interface Signalling Layer 3; General Aspects (GMS 04.07 version 5.2.0)" section 11 "Messages."

* cited by examiner

Primary Examiner—Kwang Bin Yao
(74) Attorney, Agent, or Firm—Pillsbury Winthrop LLP

(57) ABSTRACT

The invention relates to a method of identifying a protocol data unit in a network layer of an air interface in a cellular radio network, to a cellular radio network and to a protocol data unit. A network layer usually includes connection management, mobility management and radio resources management sublayers. In the invention, the radio resources management sublayer is replaced by a radio network sublayer. A protocol data unit header includes a protocol discriminator. Some of the protocol discriminator values are allocated to the identification of protocol data units in the connection management sublayer and the mobility management sublayer. According tot the invention, at least one unreserved value of the protocol discriminator is used for identifying protocol data units in the radio network sublayer.

15 Claims, 6 Drawing Sheets

| | 8 7 6 5 4 3 2 1 | |
|---|---|---|
| 0 | x x x x 0 0 0 0 | GSM - group call control |
| 1 | x x x x 0 0 0 1 | GSM - broadcast call control |
| 2 | x x x x 0 0 1 0 | GSM - PDSS1 |
| 3 | x x x x 0 0 1 1 | GSM - call related SS messages |
| 4 | x x x x 0 1 0 0 | GSM - PDSS2 |
| 5 | x x x x 0 1 0 1 | GSM - mobility management messages |
| 6 | x x x x 0 1 1 0 | GSM - radio resources management messages |
| 7 | x x x x 0 1 1 1 | UMTS 1 |
| 8 | x x x x 1 0 0 0 | UMTS 2 |
| 9 | x x x x 1 0 0 1 | GSM - SMS messages |
| 10 | x x x x 1 0 1 0 | UMTS 3 |
| 11 | x x x x 1 0 1 1 | GSM - non-call related SS messages |
| 12 | x x x x 1 1 0 0 | UMTS 4 |
| 13 | x x x x 1 1 0 1 | UMTS 5 |
| 14 | x x x x 1 1 1 0 | GSM - reserved for PD extension |
| 15 | x x x x 1 1 1 1 | GSM - reserved for test procedures |

| 8 7 6 5 | 4 3 2 1 | |
|---|---|---|
| 0 | x x x x | 0 0 0 0 | GSM - group call control |
| 1 | x x x x | 0 0 0 1 | GSM - broadcast call control |
| 2 | x x x x | 0 0 1 0 | GSM - PDSS1 |
| 3 | x x x x | 0 0 1 1 | GSM - call related SS messages |
| 4 | x x x x | 0 1 0 0 | GSM - PDSS2 |
| 5 | x x x x | 0 1 0 1 | GSM - mobility management messages |
| 6 | x x x x | 0 1 1 0 | GSM - radio resources management messages |
| 7 | x x x x | 0 1 1 1 | UMTS 1 |
| 8 | x x x x | 1 0 0 0 | UMTS 2 |
| 9 | x x x x | 1 0 0 1 | GSM - SMS messages |
| 10 | x x x x | 1 0 1 0 | UMTS 3 |
| 11 | x x x x | 1 0 1 1 | GSM - non-call related SS messages |
| 12 | x x x x | 1 1 0 0 | UMTS 4 |
| 13 | x x x x | 1 1 0 1 | UMTS 5 |
| 14 | x x x x | 1 1 1 0 | GSM - reserved for PD extension |
| 15 | x x x x | 1 1 1 1 | GSM - reserved for test procedures |

Fig 5

METHOD OF IDENTIFYING NETWORK LAYER PDU

This application is the national phase of international application PCT/FI98/00991 filed Dec. 17, 1998 which designated the U.S.

FIELD OF THE INVENTION

The invention relates to a method of identifying a protocol data unit in a network layer of an air interface in a cellular radio network, the network layer comprising a connection management sublayer and a mobility management sublayer, and the protocol data unit comprising a header which includes a protocol discriminator, some of the protocol discriminator values being allocated to the identification of protocol data units in the connection management sublayer and the mobility management sublayer.

BACKGROUND OF THE INVENTION

The above described arrangement can be used in GSM systems. In new systems developed on the basis of the GSM system, such as the UMTS (Universal Mobile Telephone System), the introduction of new sublayers causes problems because new fields must then be added to the protocol data unit in order to allow the protocol data units of the new sublayers to be identified. This increases the size of the protocol data units.

BRIEF DESCRIPTION OF THE INVENTION

An object of the invention is thus to provide a method and an equipment implementing the method which allow the above problems to be solved. This is achieved with a method described in the preamble, characterized in that at least one unreserved value of the protocol discriminator is used for identifying protocol data units in a radio network sublayer.

The invention also relates to a cellular radio network comprising a base station system, and a mobile station communicating with the base station system over an air interface, identifying means for identifying a protocol data unit in a network layer of an air interface by processing the protocol discriminator included in the header which the protocol data unit comprises, some of the protocol discriminator values of the identifying means being allocated to the identification of protocol data units in the connection management sublayer and the mobility management sublayer included in the network layer.

The cellular radio network of the invention is characterized in that the identifying means are arranged to use at least one unreserved value of the protocol discriminator for identifying protocol data units in a radio network sublayer.

The invention further relates to a protocol data unit in a network layer of an air interface in a cellular radio network, the network layer comprising a connection management sublayer and a mobility management sublayer, and the protocol data unit comprising a header which includes a protocol discriminator, some of the protocol discriminator values being allocated to the identification of protocol data units in the connection management sublayer and the mobility management sublayer.

The protocol data unit of the invention is characterized in that at least one unreserved protocol discriminator value is allocated to the identification of protocol data units in a radio network sublayer.

The preferred embodiments of the invention are disclosed in the dependent claims.

The invention is based on the fact that in the GSM system, some of the protocol discriminator values are not reserved for any purpose of use, so in further development work the values are available for the identification of new protocol data units.

The method and system of the invention provide various advantages. Since new fields need not be added into a protocol data unit for identification purposes, the protocol data unit does not grow bigger. This saves valuable radio capacity in the air interface. The changes involved also conform to GSM specifications.

BRIEF DESCRIPTION OF THE DRAWINGS

The invention will be now described in greater detail with reference to the accompanying drawings, of which

FIG. 5 illustrates protocol discriminator values;

DETAILED DESCRIPTION OF THE INVENTION

Figure 1:
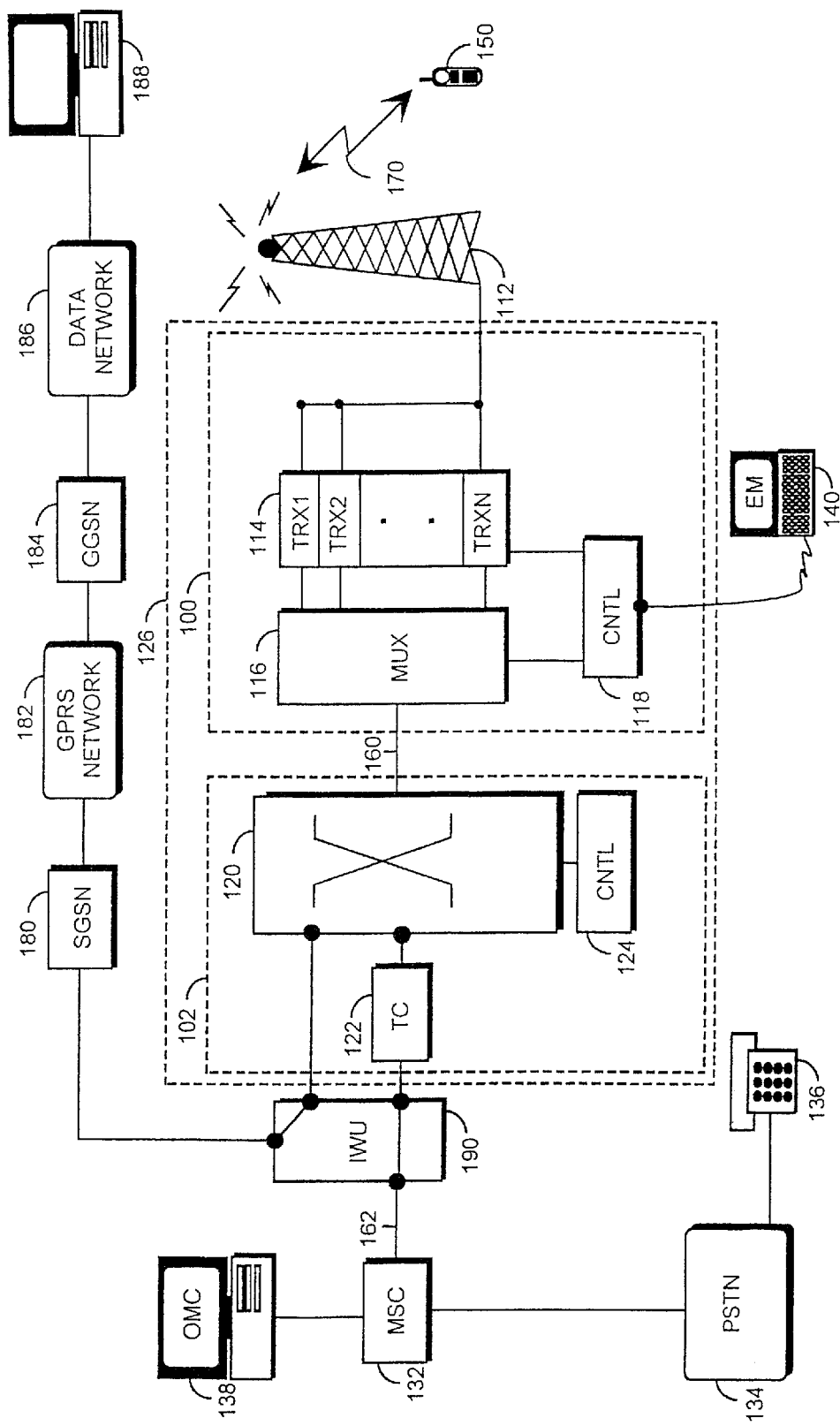
FIG. 1 illustrates an example of a cellular radio network structure.

With reference to FIG. 1, a typical cellular radio network structure of the invention is described. FIG. 1 only comprises the blocks that are essential for the description of the invention, although it is apparent to a person skilled in the art that a conventional cellular radio network also comprises other functions and structures which need not be discussed in greater detail here. The examples illustrate a cellular radio network utilizing TDMA (Time Division Multiple Access), without, however, restricting the invention thereto. The invention can be applied to GSM-based cellular radio systems, i.e. systems at least partially based on GSM system specifications, such as the UMTS (Universal Mobile Telephone System).

A cellular radio network typically comprises a fixed network infrastructure, i.e. a network part, and mobile stations 150, which may be fixedly mounted, vehicle mounted or hand-held portable terminals. The network part comprises base stations 100. A plural number of base stations 100 are, in turn, controlled in a centralized manner by a base station controller 102 communicating with them. A base station 100 comprises transceivers 114. A base station 100 typically comprises 1 to 16 transceivers 114. In TDMA radio systems, for example, a transceiver 114 offers radio capacity to one TDMA frame, i.e. typically to eight time slots.

The base station 100 comprises a control unit 118 which controls the operation of the transceivers 114 and a multiplexer 116. The multiplexer 116 arranges the traffic and control channels used by a plural number of transceivers 114 to a single transmission connection 160.

The transceivers 114 of the base station 100 are connected to an antenna unit 112 which is used for providing a bi-directional radio connection 170 to a mobile station 150. The structure of the frames transmitted in the bi-directional radio connection 170 is determined in detail, and the connection is referred to as an air interface.

Figure 2:
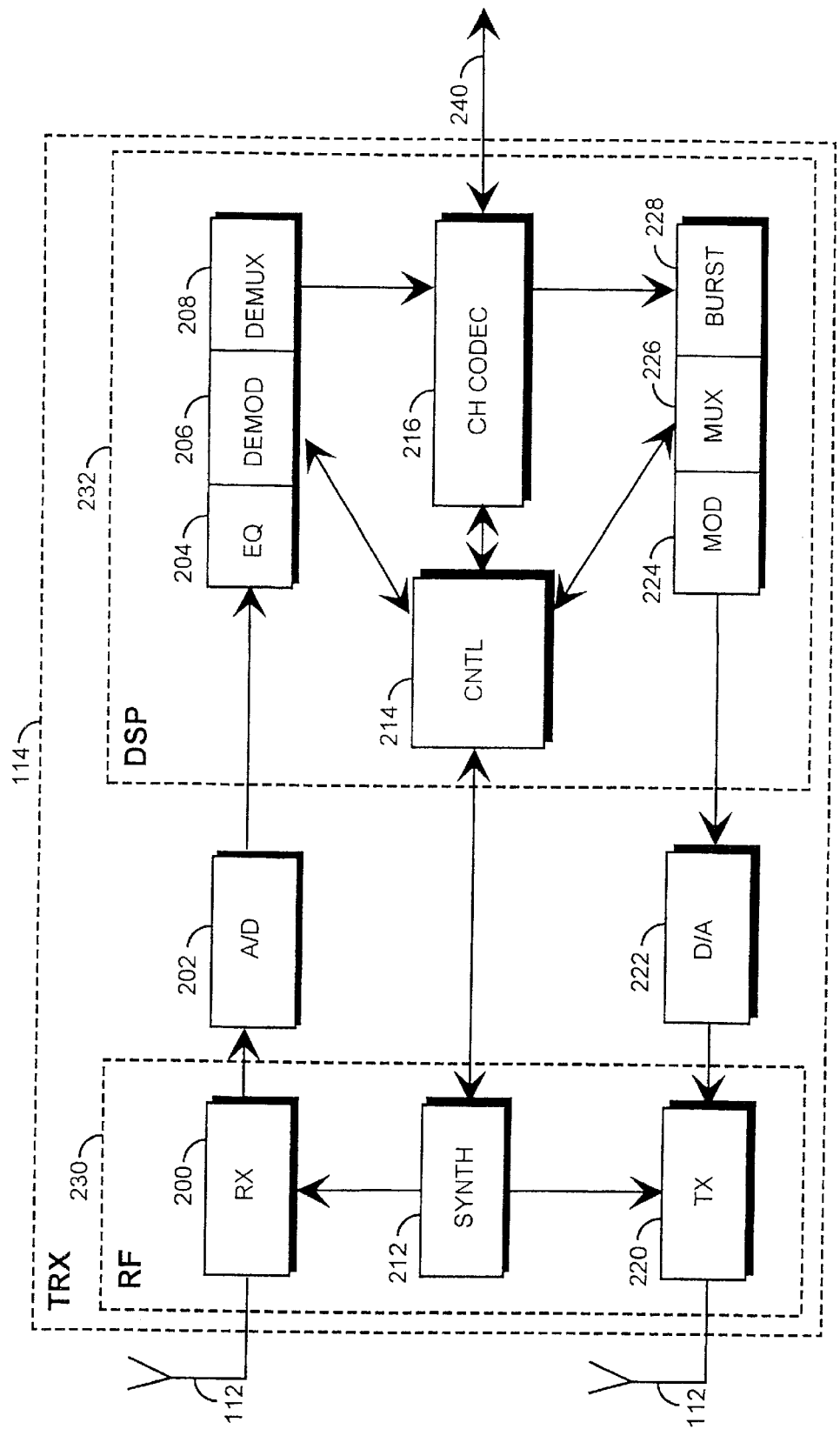
FIG. 2 illustrates a transceiver structure.

FIG. 2 illustrates in greater detail the structure of a transceiver 114. A receiver 200 comprises a filter blocking frequencies outside a desired frequency band. A signal is then converted to an intermediate frequency or directly to baseband, and in this form the signal is sampled and quantized in an analog-to-digital converter 202. An equalizer 204 compensates for interference caused for instance by multi-path propagation. From the equalized signal, a demodulator 206 takes a bit stream, which is transmitted to a demultiplexer 208. The demultiplexer 208 separates the bit stream from the separate time slots into its logical channels. A channel codec 216 decodes the bit stream of the separate logical channels, i.e. decides whether the bit stream is signalling data, which is transmitted to a control unit 214, or whether the bit stream is speech, which is transmitted 240 to a speech codec 122 of the base station controller 102. The channel codec 216 also performs error correction. The control unit 214 performs internal control functions by controlling different units. A burst former 228 adds a training sequence and a tail to the data arriving from the speech codec 216. A multiplexer 226 assigns a time slot to each burst. A modulator 224 modulates digital signals to a radio frequency carrier. This operation has an analog nature, therefore a digital-to-analog converter 222 is needed for performing it. A transmitter 220 comprises a filter restricting the bandwidth. In addition, the transmitter 220 controls the output power of a transmission. A synthesizer 212 arranges the necessary frequencies for the different units. The synthesizer 212 comprises a clock which may be locally controlled or it can be centrally controlled from somewhere else, for instance from the base station controller 102. The synthesizer 212 creates the necessary frequencies by means of a voltage controlled oscillator, for example.

As shown in FIG. 2, the structure of the transceiver can be further divided into radio frequency parts 230 and a digital signal processor including software 232. The radio frequency parts 230 comprise the receiver 200, transmitter 220 and synthesizer 212. The digital signal processor including software 232 comprises an equalizer 204, demodulator 206, demultiplexer 208, channel codec 216, control unit 214, burst former 228, multiplexer 226 and modulator 224. The analog-to-digital converter 202 is needed for converting an analog radio signal to a digital signal and, correspondingly, the digital-to-analog converter 222 is needed for converting a digital signal to an analog signal.

The base station controller 102 comprises a group switching field 120 and a control unit 124. The group switching field 120 is used for switching speech and data and for connecting signalling circuits. The base station 100 and the base station controller 102 form a Base Station System 126 which additionally comprises a transcoder 122. The transcoder 122 is usually located as close to a mobile switching centre 132 as possible because this allows speech to be transmitted between the transcoder 122 and the base station controller 102 in a cellular radio network form, which saves transmission capacity. In the UMTS system the base station controller 102 can be referred to as RNC (Radio Network Controller).

The transcoder 122 converts different digital speech coding modes used between a public switched telephone network and a radio network, to make them compatible with each other, for instance from the 64 kbit/s fixed network form to another cellular radio network form (such as 13 kbit/s), and vice versa. The control unit 124 carries out call control, mobility management, collection of statistical data and signalling.

The UMTS uses an IWU 190 (Interworking Unit) to make the base station system 126 interwork with a second generation GSM mobile switching centre 132 or a second generation packet transmission network support node 180. As shown in FIG. 1, a circuit-switched connection can be established from the mobile station 150 via the mobile switching centre 132 to a telephone 136 connected to a PSTN (Public Switched Telephone Network) 134. A ax packet-switched connection, such as GSM phase 2+packet transmission, i.e. GPRS (General Packet Radio Service), can also be used in a cellular radio network. The connection between a packet network 182 and the IWU 190 is created by a support node 180 (SGSN=Serving GPRS Support Node). The function of the support node 180 is to transfer packets between the base station system and a gateway node (GGSN=Gateway GPRS Support Node) 184 and to keep record of the mobile station's 150 location within its area.

The IWU 190 can be a physically separate device, as in FIG. 1, or it can be integrated as part of the base station controller 102 or the mobile switching centre 132. As FIG. 1 shows, when transcoding of the data to be transferred is not allowed, packet transmission data is not necessarily transferred through the transcoder 122 between the IWU 190 and the group switching field 120.

The gateway node 184 connects the packet network 182 and a public packet network 186. The interface can be provided by an Internet protocol or an X.25 protocol. The gateway node 184 encapsulates the internal structure of the packet network 182, thus masking it from the public packet network 186, so for the public packet network 186 the packet network 182 looks like a sub-network, and the public packet network can address packets to a mobile station 150 located in the sub-network and receive packets from it.

A typical packet network 182 is a private network applying an Internet protocol and conveying signalling and tunnelled user data. The structure of the network 182 can vary according to operator, both as regards its architecture and its protocols below the Internet protocol layer.

The public packet network 186 can be for instance a global Internet network into which a terminal 188, for instance a server, with a connection to the network wants to transmit packets addressed to the mobile station 150.

The mobile switching centre 132 is connected to an OMC (Operations and Maintenance, Centre) controlling and monitoring the operation of a radio telephone system. The operations and maintenance centre 132 is usually a fairly efficient computer provided with a specific software. The control can also involve separate parts of the system, because control channels needed for control data transfer can be arranged on data transmission connections established between different parts of the system.

Further, the personnel installing a network and controlling the operations possibly have a portable computer including an EM (Element Manager) 140 at their disposal for the management of separate network elements. The Figure shows an example in which the device 140 is connected to a data transmission port located in the control unit 118 of the base station 100, thus enabling the operation of the base station 100 to be monitored and controlled, for instance by examining and changing the values of parameters regulating the operation of the base station.

The structure of the mobile station 150 can be described utilizing the description of the structure of the transceiver 114 in FIG. 2. The structural parts of the mobile station 150 are operationally the same as those of the transceiver 114. The mobile station 150 additionally comprises: a duplex filter between the antenna 112 and the receiver 200 and between the antenna 112 and the transmitter 220, interface parts and a speech codec. The speech codec is connected to a channel codec 216 via a bus 240.

Figure 3:
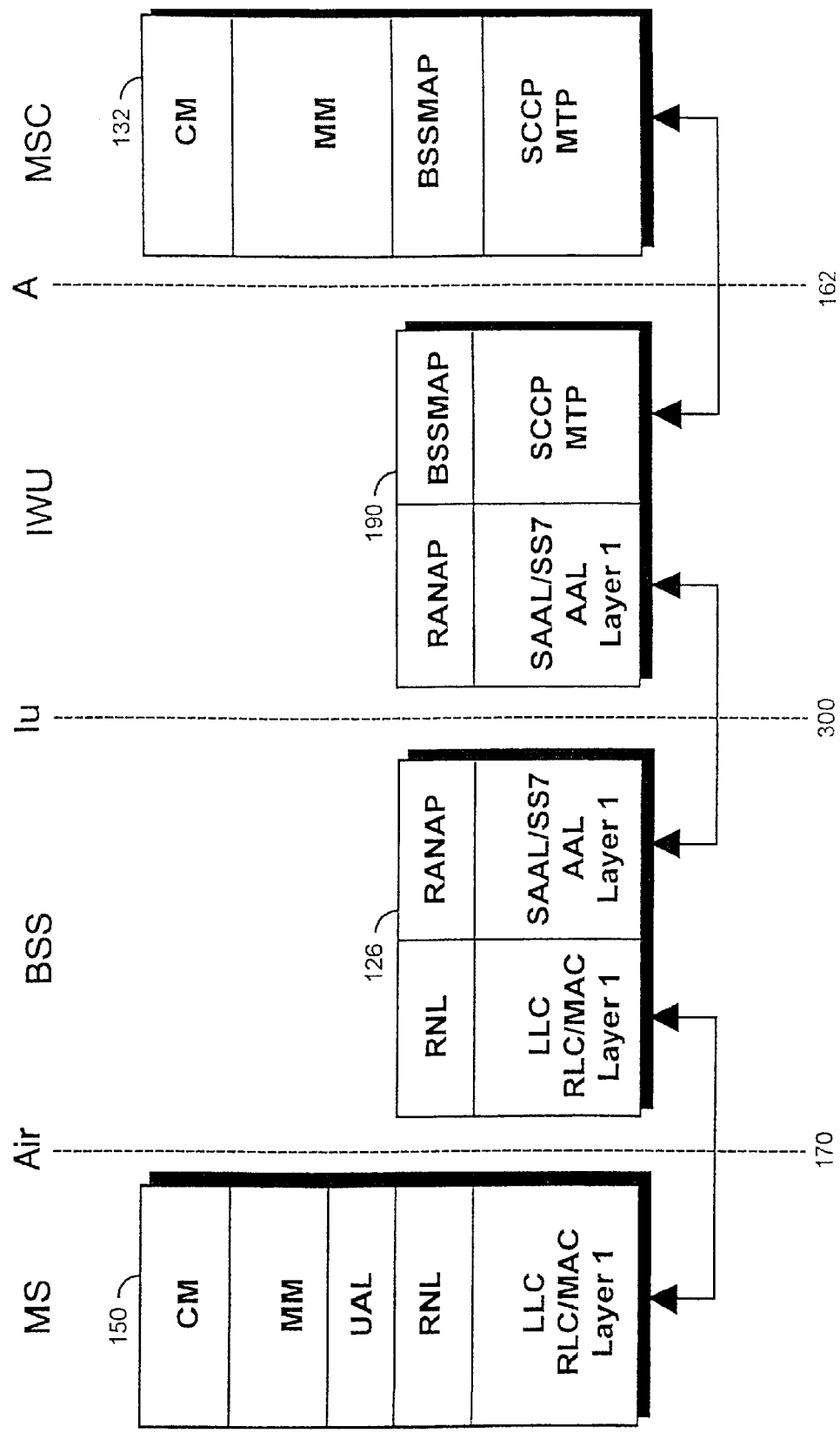
FIG. 3 illustrates protocol stacks of the invention.

Since the present invention relates to the processing of protocols used in a cellular radio network, an example illustrating the implementation of the necessary protocol stacks will be described with reference to FIG. 3. The left-most protocol stack in FIG. 3 is a protocol stack located at the mobile station 150. The next protocol stack is in the base station system. 126. The third protocol stack is located in the IWU 190. The right-most protocol stack is located in the mobile switching centre 132. The air interface 170 provided by means of the radio connection 170 between the mobile station 150 and the base station system can also be referred to as an Um interface. An interface 162 between the base station system 126 and the mobile switching centre 132 is called an A interface. The interface between the base station system 126 and the IWU is an Iu interface 300.

The protocol stacks are formed according to an OSI (Open Systems Interconnection) model of the ISO (International Standardization Organization). In the OSI model protocol stacks are divided into layers. There can be seven layers. A layer in each device 150, 126, 190, 132 communicates logically with a layer in another device. Only the lowest, physical layers communicate with each other directly. Other layers always use services provided by a following, lower layer. A message must therefore physically travel in a vertical direction between the layers, and only in the lowest layer the message travels horizontally between the layers.

The actual bit level data transmission takes place through the lowest (the first) layer, i.e. a physical layer, Layer 1. In the physical layer are determined mechanical, electronic and operational characteristics for connecting to a physical transmission link. In the GSM, the physical layer in the air interface 170 is provided by means of TDMA technology.

The next (the second) layer, i.e. a data link layer, uses the services of the physical layer to provide reliable data transmission, which includes correction of transmission errors, for example.

In the air interface 170, the data link layer is divided into an RLC/MAC sublayer and an LLC sublayer. In the RLC/MAC sublayer (Radio Link Control/Medium Access Control), the RLC part is responsible for segmenting and collecting the data to be transmitted. In addition, the RLC part masks quality fluctuations in the radio interface 170 of the physical layer from the upper layers. The MAC part allocates traffic channels to and releases them from the radio bearers. The LLC sublayer controls the data flow at the interface between the second and the third layer. The LLC layer transfers the received data flow on the radio connection 170 applying error detection and correction levels required by the quality of service of the offered service. An implementation where a radio network sublayer, to be described below, communicates directly with the RLC/MAC sublayer is also possible.

The third layer, i.e. the network layer, offers to the upper level independence of the data transmission and switching techniques that are used for providing the connection between mobile stations. The network layer carries out connection set-up, maintenance and releasing, for example. A GSM network layer is also known as a signalling layer. It has two main functions: to route messages and to provide for the possibility of a plural number of independent, simultaneous connections between two entities.

The network layer of a conventional GSM system comprises a connection management sublayer CM, a mobility management sublayer MM and a radio resources management sublayer.

The radio resources management sublayer is responsible for frequency spectrum management and for the reactions of the system to changing radio circumstances. It is further responsible for maintaining a high-quality channel, e.g. by taking care of channel selection, the releasing of a channel, possible frequency hopping sequences, power adjustment, timing, reception of mobile station measurement reports, adjustment of a timing advance, encryption settings and handover between cells. Messages of this sublayer are transferred between the mobile station 150 and the base station controller 102.

The mobility management sublayer MM handles such consequences caused by the mobility of a mobile station user which do not directly relate to the operation of the radio resources management sublayer. In a fixed network this sublayer would take care of checking user authorities and connecting the user to the network. In cellular radio networks the sublayer in question thus supports user mobility, registration and management of data caused by mobility. The sublayer also checks mobile station identity and the identities of the services allowed. Data transmission concerning the sublayer takes place between the mobile station 150 and the mobile switching centre 132.

The connection management sublayer CM manages all operations associated with circuit-switched call management. The operations involved are provided by a call management entity. In addition, other services, such as SMS (Short Message Service), are provided by separate entities. The connection management sublayer does not detect user mobility. The GSM connection management sublayer operations are therefore almost directly inherited from the ISDN (Integrated Services Digital Network) of the fixed network. The call management entity sets up, maintains and releases calls. It has specific procedures which it applies to calls originated by and terminating to the mobile station 150. Also in this sublayer messages are transferred between the mobile station 150 and the mobile switching centre 132.

The TDMA technique employed in an ordinary physical GSM layer is replaced in the UMTS by a broadband CDMA technique (Code Division Multiple Access), broadband TDMA technique, or by a combination of broadband CDMA and TDMA techniques. In this case the GSM radio resources management sublayer can not be re-used in the UMTS, but it is replaced by a radio network sublayer RNL providing corresponding services upward. The radio network sublayer can be divided into RBC (Radio Bearer Control) and RRC (Radio Resource Control) sublayers, but it can also be kept as a single entity. When kept as a single entity, it can be called an RRC sublayer. If the division into sublayers is applied, then the RRC sublayer performs e.g. broadcasting and paging of cell data, processing of mobile station 150 measurement results, and handovers. The RBC sublayer provides the logic connection establishment, thereby determining e.g. radio bearer bit rate, bit/error ratio and whether the transmission concerned is packet-switched or circuit-switched.

The mobile station 150 needs a UAL (UMTS Adaptation Layer) sublayer between the mobility management and radio network sublayers, the UAL sublayer changing the primitives of a upper mobility management sublayer to primitives of a lower radio network sublayer. The UAL layer enables a plural number of separate mobility management sublayers (such as GPRS and GSM mobility management sublayers) to be arranged into one and the same radio network sublayer.

The only network sublayer processed in the base station system 126 is the radio network sublayer; messages of the connection management and mobility management sublayers are transparently processed, in other words, they are simply transferred back and forth through specific sublayers. A RANAP sublayer (Radio Access Network Application Part) provides procedures for negotiating and managing both circuit-switched and packet-switched connections. It corresponds to BSSAP (Base Station System Application Part) in the GSM, the BSSAP comprising BSSMAP (Base Station System Management Part) and DTAP (Direct Transfer Application Part).

Lower layers of the Iu interface 300 can be implemented for instance by means of ATM (Asynchronous Transfer Mode) protocols: SAAL/SS7 (Signalling ATM Adaptation Layer/Signalling System Number 7), AAL (ATM Adaptation Layer).

The IWU 190 comprises RANAP, SAAL/SS7, AAL sublayers and physical layers corresponding to those of the base station system 126.

The IWU 190 and the mobile switching centre 132 further comprise a BSSMAP sublayer through which data associated with a particular mobile station 150 and control data associated with the base station system 126 are transferred between the IWU 190 and the mobile switching centre 132.

In the A interface the first and second layers are implemented by means of MTP and SCCP sublayers (Message Transfer Part, Signalling Connection Control Part). Their structure is simpler than in the air interface 170, because mobility management, for example, is not needed.

Since the invention relates to the identifying of protocol data units in a third layer, a radio network layer more specifically, the structure of a protocol data unit of a third layer will be described with reference to FIG. 4A. The protocol data unit comprises an Imperative Part IP and, possibly, a Non-Imperative Part NIP. The imperative part IP comprises a header H and, possibly, Standard Information Elements SIE. The non-imperative part NIP also comprises standard information elements.

Figure 4B:
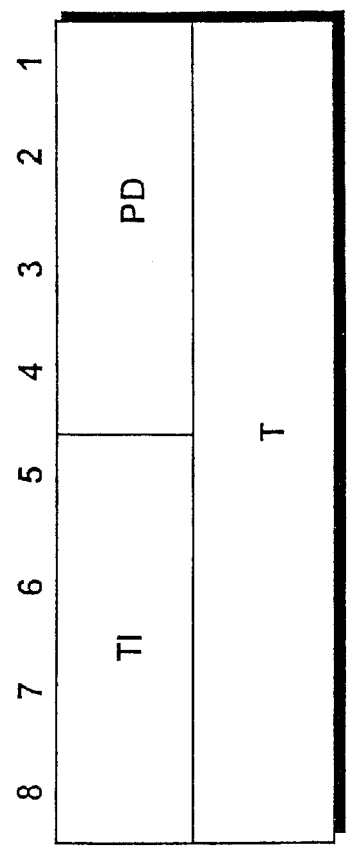
FIG. 4B illustrates a header structure.
Figure 4A:
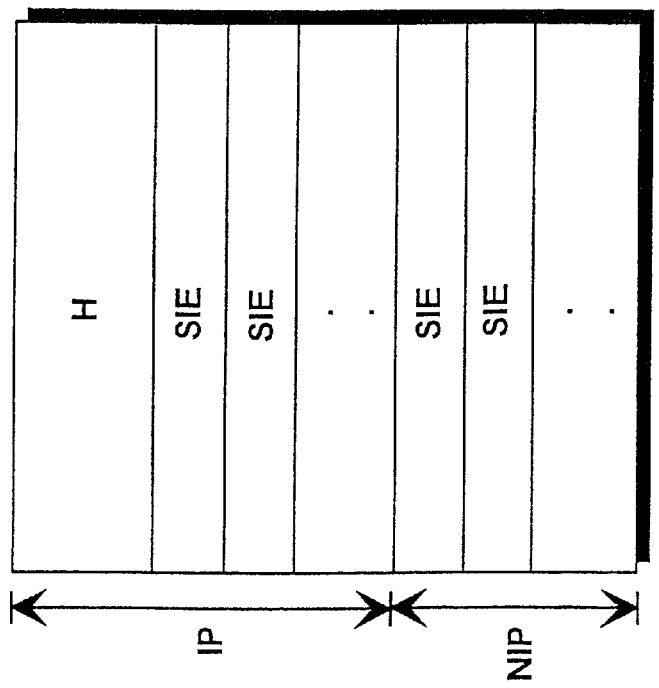
FIG. 4A illustrates a protocol data unit structure.

FIG. 4B shows the header structure in greater detail. The header comprises two eight-bit octets.

A half of a first octet forms a protocol discriminator PD, which is used for identifying the protocol sublayer a message is addressed to. The base station system 126 processes the messages addressed to the radio network sublayer, other messages being processed in the mobile switching centre 132. The mobile station 150 naturally processes all messages addressed to it, irrespective of the sublayer concerned.

A second half of the first octet is used, when necessary, as a Transaction Identifier TI to distinguish simultaneous call management connections, if any, and transactions performed using such simultaneous call management connections. The TI remains unchanged for the entire duration of a transaction.

A second octet is used as a Message Type Octet, to determine the function of a message. The number of imperative and non-imperative standard information elements depends on the message type.

Additional information on the protocol data unit structure is available, if needed, in the ETSI (European Telecommunications Standards Institute) specification ETS 300 939 (August 1997, Second Edition) "Digital cellular telecommunications system (Phase 2+); Mobile radio interface signalling layer 3; General Aspects (GSM 04.07 version 5.2.0)", section 11 "L3 Messages".

FIG. 5 illustrates reserved values of the protocol discriminator. On the horizontal lines at the left, the Figure shows the header's first octet, the first four bits of which usually form the protocol discriminator PD. According to the above mentioned ETSI specification, protocol discriminator values 0, 1, 2, 3, 4, 5, 6, 9, 11, 14 and 15 are reserved for the identification of protocol data units. The value 0 is reserved for a Group Call Control, value 1 for a Broadcast Call Control, value 2 for first Protocol Discriminator Supplementary Services (PDSS1), value 3 for Call Related Supplementary Service Messages, value 4 for second Protocol Discriminator Supplementary Services (PDSS2), value 5 for Mobility Management Messages, value 6 for Radio Resources Management Messages, value 9 for Short Message Service Messages (SMS Messages), value 11 for Non-call Related Supplementary Service Messages, value 14 for PD Extension, and value 15 for Test Procedures.

Values 7, 8, 10, 12 and 13 are therefore not reserved for any function. According to the invention, at least one of the unreserved values is used for identifying protocol data units in a radio network sublayer.

Since the radio resources management sublayer is not used in the UMTS, the value 6 can also be used—when separately agreed on—for identifying protocol data units in a radio network sublayer.

The invention is preferably implemented by software, and the invention therefore requires functions to be provided in the control unit 124 of the base station controller 102 and in the processor 214 of the transceiver of the mobile station 150.

Figure 6:
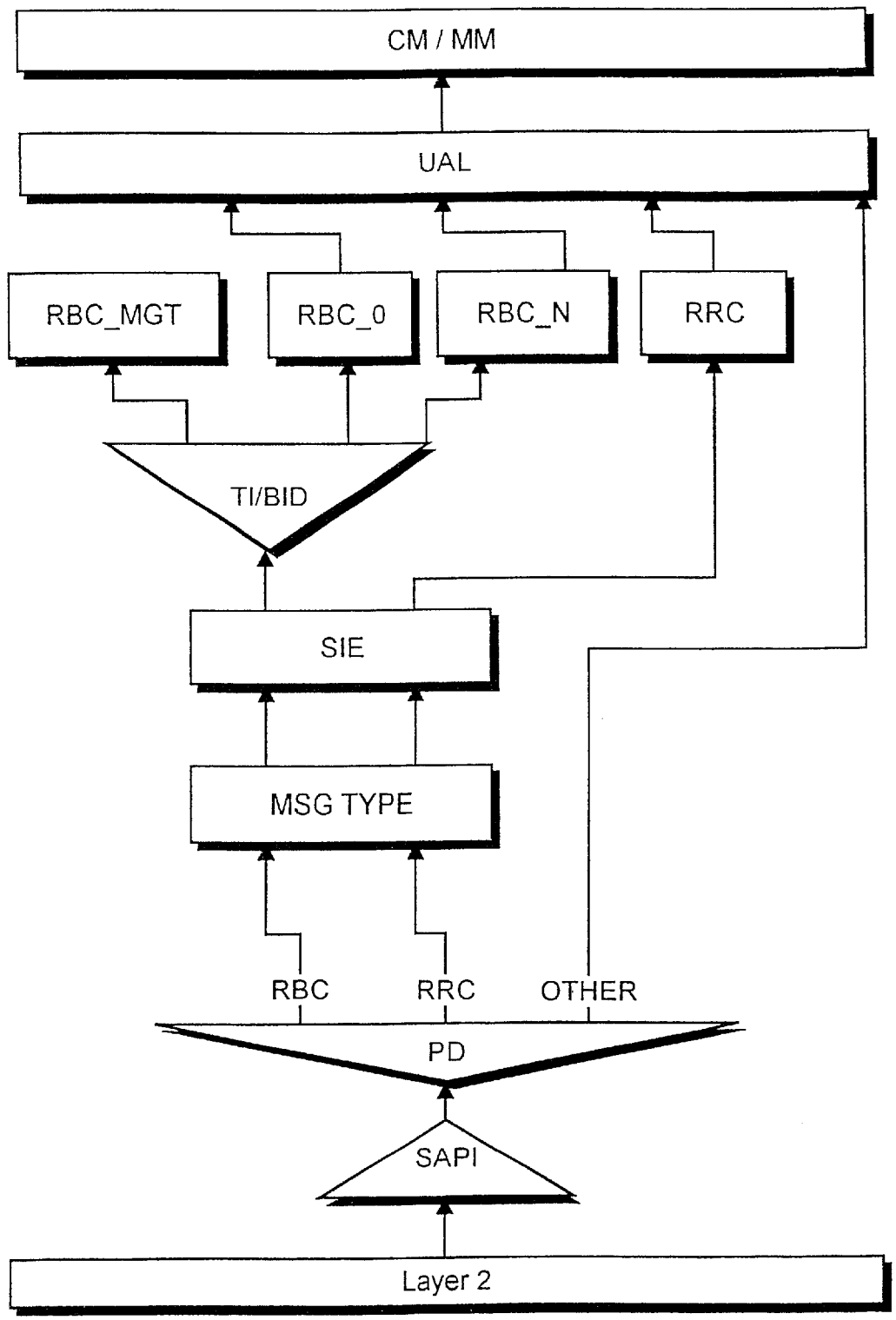
FIG. 6 illustrates a structure of a software processing a protocol data unit in a mobile station.

FIG. 6 illustrates how processing by software is carried out when a protocol data unit is received at the mobile station 150.

The protocol data unit is received from the data link layer Layer 2 through a Service Access Point Identifier SAPI. The SAPI determines the interface from the data link layer to upper layers, in this case to the radio network sublayer. The protocol data unit is then transferred to identifying means PD where the protocol data unit is identified on the basis of the protocol discriminator it contains.

According to the invention, the identifying means PD are arranged to use at least one of the unreserved protocol discriminator values for identifying protocol data units that are meant to be processed by entities of the radio network sublayer. In FIG. 6, the new identifiers of the radio network layer are denoted with RBC and RRC. The RBC and RRC thus take their values from among the unreserved values 7, 8, 10, 12 and 13. Other reserved values are indicated in the Figure by 'Other'. Protocol data units provided with reserved values are transferred to be processed in other sublayers of the third layer, i.e. the connection management sublayer CM and the mobility management sublayer MM.

A message type MSG TYPE of the protocol data units identified as units to be processed by the radio network layer will be examined next, the message type indicating the standard information elements SIE the protocol data unit contains.

The RBC messages are transferred to transaction means TI/BID for processing, and the RRC messages to an RRC entity for processing.

The transaction means TI/BID then process the transaction identifier. According to one embodiment of the invention, the transaction identifier is also used in the radio network sublayer. If the mobile station 150 has initiated a call, the radio bearer has not had an identifier yet because it is always allocated by the network part. A separate transaction identifier is therefore needed to allow each network reply to be associated with the correct entity, because a plural number of radio bearer set-up procedures can take place simultaneously. A radio bearer control management entity RBC_MGT creates separate control entities RBC_0, . . . RBC_N for each set-up procedure., When a control entity has received from the network a first protocol data unit informing the radio bearer identifier BID (Bearer Identifier) that corresponds to the transaction identifier TI, the transaction identifier can be released, the transaction means TI/BID then transferring following protocol data units to the correct control entity.

The bearer identifier BID is placed into the non-imperative portion of the protocol data unit as a standard information element. The transaction identifier TI is coded into a half octet, bit 8 being a flagbit and bits 7, 6 and 5 providing the actual transaction identifier. A flagbit 0 indicates that the bearer identifier BID has not received any value yet. A flagbit 1 indicates that the protocol data unit contains the bearer identifier BID. A value 000 of the actual transaction identifier means that the transaction identifier is not in use, The transaction identifier can take seven actual values: 001, 010, 011, 100, 101, 110, 111. This also sets a limit to the number of simultaneous radio bearer set-up procedures initiated by the mobile station 150.

When necessary, the control entities and the RRC entity transfer the protocol data unit also to other sublayers of the network layer for processing.

An extra advantage provided by the described method is that introduction of new functions for processing by the radio network sublayer allows the radio network sublayer to read any messages it finds interesting as they pass through, although they are addressed to upper sublayers, and to take the information it needs. Messages of interest are identified in the identifying means PD on the basis of the protocol discriminator.

Another advantage is that messages of the upper sublayers (mobility management, control management) need not be conveyed over the air interface in the protocol data units of the radio network sublayer, but the radio network sublayer can directly check in the protocol discriminator which layer is to process the message concerned. A method of identification other than the one described in the invention would require the upper sublayer messages to be packed as data messages of the radio network sublayer before they are transferred over the air interface. This would introduce at least one additional octet to each message.

Processing by software, as described in connection with FIG. 6, is carried out at the mobile station 150 also in the transmit direction, and in the base station system 126 in both transmit and receive direction.

Although the invention is described above with reference to an example shown in the accompanying drawings, it is apparent that the invention is not limited to it, but can vary in many ways within the inventive idea disclosed in the attached claims.

What is claimed is:

1. A method of identifying a protocol data unit in a network layer of an air interfaces in a cellular radio network, the network layer comprising a connection management sublayer and a mobility management sublayer, and the protocol data unit comprising a header which includes a protocol discriminator, some of the protocol discriminator values being allocated to the identification of protocol data units in the connection management sublayer and the mobility management sublayer, the method comprising:

using at least one unreserved value of the protocol discriminator for identifying protocol data units in a radio network sublayer.

2. The method according to claim 1, wherein reserved values comprise the values 0, 1, 2, 3, 4, 5, 6, 9, 11, 14, 15.

3. The method according to claim 1, wherein unreserved values comprise the values 7, 8, 10, 12, 13.

4. The method according to claim 1, wherein the header comprises a transaction identifier which is used in a connection initiated by a mobile station.

5. The method according to claim 4, wherein the transaction identifier is provided by a half octet unused by the protocol discriminator.

6. The method according to claim 1, wherein the protocol data unit further comprises a radio bearer identifier.

7. The method according to claim 1, wherein there is a one-to-one correspondence between the sublayers and the protocol data units.

8. A cellular radio network comprising:

a base station system, a mobile station communicating with the base station system over an air interface, and identifying means for identifying a protocol data unit in a network layer of the air interface by processing a protocol discriminator included in a header which the protocol data unit comprises, some of the protocol discriminator values of the identifying means being allocated to the identification of protocol data units in the connection management sublayer and the mobility management sublayer included in the network layer, wherein the identifying means are arranged to use at least one unreserved value of the protocol discriminator for identifying protocol data units in a radio network sublayer.

9. The cellular radio network according to claim 8, wherein reserved values of the identifying means comprise the values 0, 1, 2, 3, 4, 5, 6, 9, 11, 14, 15.

10. The cellular radio network according to claim 8, wherein unreserved values of the identifying means comprise the values 7, 8, 10, 12, 13.

11. The cellular radio network according to claim 8, further comprising transaction means for processing a transaction identifier included in the header, the transaction identifier being arranged to be used in a connection initiated by the mobile station.

12. The cellular radio network according to claim 11, wherein the transaction means process an unused half octet of the protocol discriminator as the transaction identifier.

13. The cellular radio network according to claim 8, further comprising transaction means for processing the radio bearer identifier included in the protocol data unit.

14. The cellular radio network according to claim 13, wherein the transaction means are arranged to set a one-to-one correspondence between the sublayers and the protocol data units.

15. A protocol data unit in a network layer of an air interface in a cellular radio network, the network layer comprising a connection management sublayer and a mobility management sublayer, the protocol data unit comprising:

a header which includes a protocol discriminator, some of the protocol discriminator values being allocated to the identification of protocol data units in the connection management sublayer and the mobility management sublayer, wherein at least one unreserved protocol discriminator value is allocated to the identification of protocol data units in the radio network sublayer.

* * * * *